April 22, 1930.  A. GAUDENZI  1,755,320
RECTIFIER SYSTEM
Filed Aug. 22, 1927
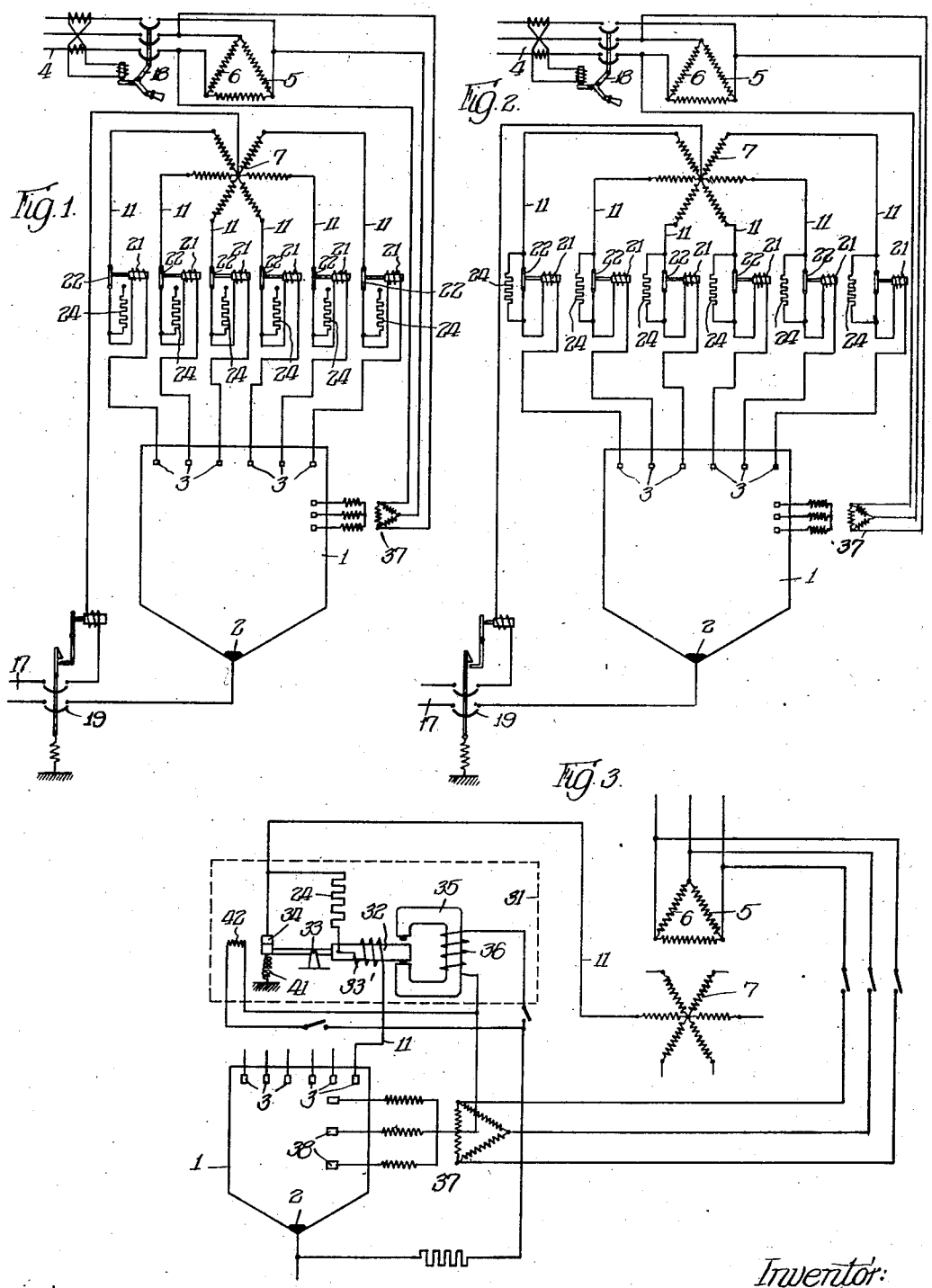

Patented Apr. 22, 1930

1,755,320

UNITED STATES PATENT OFFICE

ARTHUR GAUDENZI, OF BADEN, SWITZERLAND, ASSIGNOR TO A. G. BROWN BOVERI & CIE., OF BADEN, SWITZERLAND, A JOINT-STOCK COMPANY OF SWITZERLAND

RECTIFIER SYSTEM

Application filed August 22, 1927, Serial No. 214,505, and in Germany August 28, 1926.

This invention relates to rectifier systems and it has among its objects the protection of rectifiers of the mercury vapor and similar types against damage caused by back-fire or internal short circuit between the rectifier electrodes. Another object of the invention is the provision of protective systems for such rectifiers which will eliminate the necessity of cutting out the rectifier from service in case of an internal short circuit, and render small internal short circuits and the like substantially without effect on the continuity of the operation of the rectifier.

The invention will be best understood by reference to the accompanying drawings wherein Figs. 1 to 3 are diagrammatic views of rectifier systems embodying different forms of the invention.

In rectifiers of the mercury vapor type, back-fire between the anodes of the rectifier has been the most frequent cause of interruptions and breakdowns. Such back-fires occur when the conducting arc in the mercury vapor persists over the portion of the alternating current period during which the valve action of the rectifier should be exercised. A back-fire of such nature provides a conducting path over which the reversal of current takes place and also forms a short circuit for the alternating current system from which the rectifier is fed. In the systems as known heretofore, protection against such back-fire was obtained either by overload or reverse current relays arranged to cut out the rectifier in response to the overload or reverse current flowing into the rectifier incident to an internal short circuit.

According to this invention, the back-fire phenomena may be rendered harmless, for the continuing rectifier operation, without entirely cutting off the same from the system, by inserting a sufficiently large ohmic resistance in the circuit of the individual anodes. In this way the intensity of the back current flow may be so far reduced as to permit continuity of the rectifier operation, that is, avoid the necessity of cutting out the rectifier from service.

In accordance with the invention, the resistances are not permanently connected in the anode circuits but are normally short circuited or otherwise cut off from the circuit and are only inserted in the circuit to limit the current flow through the anodes in response to the occurrence of a back-fire within the rectifier. The control of the connections of the resistances may be effected through the agency of an instantaneously operating reverse-current relay, for instance.

Fig. 1 shows a rectifier system embodying one form of the invention. A six-phase mercury vapor rectifier 1 has a cathode 2 and six anodes 3 which are supplied from a three-phase alternating-current line 4, through a transformer 5 having a primary winding 6 and a secondary star-connected six-phase winding 7. The end terminals of the six star-connected secondary transformer windings 7 are connected to the anodes 3 of the rectifier through six leads 11. The direct current is derived from the rectifier through a line 17 leading from the cathode 2 and the star point of the transformer winding 7. An alternating-current circuit breaker 18 is included in the supply leads to the transformer 5 and is arranged to cut off the rectifier from the alternating-current line in response to an overload. A direct current circuit breaker 19 is connected in the direct current leads of the rectifier and is arranged to disconnect the rectifier from the direct current line in response to excess direct current flow through the rectifier.

According to the invention, damage to the rectifier and to the system on account of back-fire is avoided without necessitating disconnection of the rectifier from the alternating-current and direct current lines by providing in each of the anode leads 11 means for automatically inserting a resistor or similar current limiting device in response to the occurrence of a back-fire within the rectifier. To this end each of the leads 11 includes a polarized relay 21 included in series with the leads to the respective anodes 3. This relay 21 operates a switch 22 also arranged in series with the leads 11.

When the switch 22 is in normal position, a direct connection is provided between the end terminals of the secondary transformer windings 7 and the respective anodes 3 of the rectifier, only the polarized relay 21 being included in series with the circuit. When the switch 22 is thrown to the right by the action of the relay 21, the direct connection from the transformer to the anodes is opened and a current-limiting resistor 24 is included in series with the leads 11, the resistor being so proportioned as to so limit the back current flow that it is rendered substantially harmless and permits restoration of the operating conditions in the rectifier to normal.

The operation of the polarized relay 21 is such that on occurrence of a back-fire, with the incident reverse current flow into the rectifier, and overload on the circuit breakers 18 and 19, the switch 22 will be thrown to the right to insert the current-limiting resistor 24 before the main circuit breakers 18 and 19 are opened. An opportunity is thus given to the rectifier to restore itself to normal operating condition and in most cases the insertion of the current-limiting resistor 24 will suffice to so limit the current in the alternating-current and direct current lines 4 and 17, respectively, that the two circuit breakers 18 and 19 will not be required to operate. The insertion of the current-limiting resistor 24 will thereupon quickly re-establish normal operating conditions in the rectifier, whereupon the relay 21 will permit the switch 22 to again go back to its normal position at which position the current-limiting resistor 24 is cut out.

In the form of the invention shown in Fig. 2, the current-limiting resistor is permanently connected across the terminals of the switch 22 which is operated by the polarized reverse current relay 21. As long as the switch 22 is closed under normal operating conditions, the resistance 24 will be short circuited and without effect on the current flow through the rectifier. On occurrence of a reverse current flow, the switch 22 will open, thereby inserting the current-limiting resistor in series with the anode leads.

In another form of the invention shown in Fig. 3 a reverse current relay 31 of special form is used, comprising a soft iron armature 32 pivoted at 33 or arranged to close and open a pair of contacts 34 for short circuiting the current-limiting resistor 24 in the anode leads. The armature 32 carries a coil 33' which is included in series with the anode leads 11 to magnetize the armature in either one or another direction depending on the direction of the current flow to the anodes. The polarized end of the armature is arranged to move between the poles of a polarized magnet 35 which may be either of permanently magnetized steel, or of soft iron, which is excited by direct current through an exciting coil 36 energized from some auxiliary source, as for instance, from the transformer 37 which supplies the exciting anodes 38 of the rectifier.

The relay 31 is so arranged that, with the normal direction of current flow to the anodes, the armature 32 is pulled downwardly so as to hold the contacts 34 closed, thereby short circuiting the current-limiting resistor 24 in the anode leads. However, on occurrence of a reverse current flow, the armature 32 will be pulled upwardly, opening the resistor 24 in the anode leads to limit the back current flow and thus reestablishing normal operating conditions within the rectifier. The entire relay 31 may be immersed in oil within a suitable container in which the resistor 24 may also be mounted, as indicated by the dotted rectangle.

With such arrangement, only very small travel of the contacts 34 will be sufficient for inserting the resistor 24 into the anode leads.

The relay 31 may be arranged to operate in such manner as to open the contacts 34 at the moment when there is no current flowing therethrough. To this end, the armature 32 may have an additional spring 41 tending to open the contacts 34 of the relay. Under the action of the current traversing the anode circuit, the armature will then oscillate with the frequency of the anode currents, the latter flowing only during a portion of each alternating current period and being zero at the remainder of the time. By making the spring 41 sufficiently strong, the contacts 34 will open during the zero current period in the anode, thus opening the main circuit during zero current conditions.

To secure positive interruption of the circuit at the contacts 34, a special magnetic blow-out coil 42 may be provided, the latter being suitably supplied, for instance, in parallel to the exciting coil 36 of the relay or in series with the respective anodes.

I claim:

1. In a rectifier installation, a mercury vapor rectifier comprising mercury cathode means and a plurality of anodes providing a plurality of parallel rectifying paths, a polyphase transformer having a plurality of star-arranged windings connected to said anodes, a plurality of current-limiting resistors associated with the individual anode circuits, and reverse current relay means associated with said circuits for inserting said current-limiting resistors in the respective anode circuits in response to a reverse current flow therein.

2. In a rectifier installation, a mercury vapor rectifier comprising mercury cathode means and a plurality of anodes cooperating therewith, a polyphase transformer having a plurality of phase terminals connected to said anodes, said anode circuits including individually current-limiting resistors, and a reverse current relay associated with each of said circuits to short circuit said resistors under normal current flow conditions and to open the short circuit on occurrence of reverse current flow.

3. In a rectifier installation, a mercury vapor rectifier comprising mercury cathode means and a plurality of anodes cooperating therewith, a polyphase transformer having a plurality of phase terminals connected to said anodes, said anode circuits including individually current-limiting resistors, a reverse current relay associated with each of said circuits to short circuit said resistors under normal current flow conditions and to open the short circuit on occurrence of reverse current flow, said reverse current relay comprising an armature movable between a position at which the associated resistors are short circuited and a position at which said short circuit is broken, an exciting coil associated with said armature and connected in series with the associated anode circuits, and a polarizing magnet for said armature.

4. In a rectifier installation, a mercury vapor rectifier comprising mercury cathode means and a plurality of anodes cooperating therewith, a polyphase transformer having a plurality of phase terminals connected to said anodes, said anode circuits including individually current-limiting resistors, a reverse current relay associated with each of said circuits to short circuit said resistors under normal current flow conditions and to open the short circuit on occurrence of reverse current flow, said reverse current relay comprising an armature movable between a position at which the associated resistors are short circuited and a position at which said short circuit is broken, an exciting coil associated with said armature and connected in series with the associated anode circuits, a polarizing magnet for said armature, and a source of uni-directional excitation for said polarizing magnet, said source constituting the exciting transformer for maintaining said rectifier in excited condition.

5. In a rectifier installation, a mercury vapor rectifier comprising mercury cathode means and a plurality of anodes cooperating therewith, a polyphase transformer having a plurality of phase terminals connected to said anodes, said anode circuits including individually current-limiting resistors, a reverse current relay associated with each of said circuits to short circuit said resistors under normal current flow conditions and to open the short circuit on occurrence of reverse current flow, said reverse current relay comprising an armature movable between a position at which the associated resistors are short circuited and a position at which said short circuit is broken, an exciting coil associated with the said armature and connected in series with the associated anode circuits, and means for imparting oscillatory movement to said armature.

6. In a rectifier installation, a mercury vapor rectifier comprising mercury cathode means and a plurality of anodes cooperating therewith, a polyphase transformer having a plurality of phase terminals connected to said anodes, said anode circuits including individually current-limiting resistors, a reverse current relay associated with each of said circuits to short circuit said resistors under normal current flow conditions and to open the short circuit on occurrence of reverse current flow, said reverse current relay comprising an armature movable between a position at which the associated resistors are short circuited and a position at which said short circuit is broken, an exciting coil associated with said armature and connected in series with the associated anode circuits, and means for imparting oscillatory movement to said armature at the frequency of the currents traversing the anode circuits.

7. In an electric current rectifying installation, a rectifier including a mercury cathode and a plurality of anodes, an alternating current supply circuit for said rectifier, a polyphase transformer supplying said rectifier from said supply circuit, current-limiting means for connection to said anodes, and means responsive to abnormal conditions within said rectifier for connecting said current-limiting means to said anodes affected by the abnormal conditions.

8. In an electric current rectifying installation, a rectifier including a mercury cathode and a plurality of anodes, an alternating current supply circuit for said rectifier, a polyphase transformer supplying said rectifier from said supply circuit, current-limiting means for connection to each of said anodes, and means responsive to abnormal conditions within said rectifier for connecting said current-limiting means to any of said anodes affected by the abnormal conditions.

9. In an electric current rectifying installation, a rectifier including a mercury cathode and a plurality of anodes, an alterating current supply circuit for said rectifier, a polyphase transformer supplying said rectifier from said supply circuit, an ohmic resistance for connection to each of said anodes, and a reverse current relay in series with said anode connections with said transformer for connecting said resistances to any one of said anodes affected by abnormal conditions within said rectifier.

In testimony whereof I have hereunto subscribed my name this 5th day of August A. D. 1927, at Zurich, Switzerland.

ARTHUR GAUDENZI.